No. 696,939. Patented Apr. 8, 1902.
J. L. CAUSEY.
SCRAPPER FOR DOUGH CUTTING MACHINES.
(Application filed Jan. 2, 1902.)
(No Model.)

Witnesses
Arthur McArthur
Geo. McDougall

Inventor:
J. L. Causey
By Fischer & Thorpe
attys

THE NORRIS PETERS CO., PHOTO-LITHO., WASHINGTON, D. C.

UNITED STATES PATENT OFFICE.

JOSEPH L. CAUSEY, OF KANSAS CITY, MISSOURI.

SCRAPPER FOR DOUGH-CUTTING MACHINES.

SPECIFICATION forming part of Letters Patent No. 696,939, dated April 8, 1902.

Application filed January 2, 1902. Serial No. 87,996. (No model.)

*To all whom it may concern:*

Be it known that I, JOSEPH L. CAUSEY, a citizen of the United States, residing at Kansas City, in the county of Jackson and State of Missouri, have invented certain new and useful Improvements in Scrappers for Dough-Cutting Machines, of which the following is a specification.

My invention relates to scrappers for dough-cutting machines—that is, machines for rolling out the dough, cutting it into crackers or cakes, and conveying the same to a convenient point, whence they are removed in sheets by long peels. All scrappers with which I am familiar operate transversely of and at right angles to a canvas belt, which conveys the dough from the rolling apparatus to the cutting devices, thence to the point of removal, and are generally objectionable because of the frequency with which they tear or rip such conveyer. They are also objectionable because they cannot be depended upon to invariably effect a clean-cut separation between the sheets of crackers or cakes and the marginal or waste strips of dough.

My object is to produce a scrapper open to neither of the objectionable features mentioned and which, furthermore, can be manufactured and secured in position upon the cutting-machine at a much lower cost than the scrappers above referred to; and it consists, essentially, of a toothed disk engaging and preferably operated by the dough and arranged at an angle to the latter and the belt, so as to deflect the waste strips toward and over the contiguous side of the machine.

The invention further consists in certain novel and peculiar features of construction and organization, as hereinafter described and claimed, and in order that it may be fully understood reference is to be had to the accompanying drawings, in which—

Figure 1:
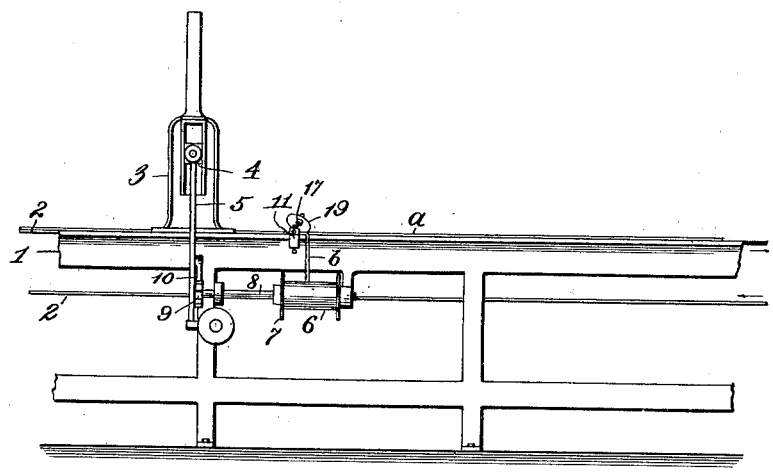
Figure 2:
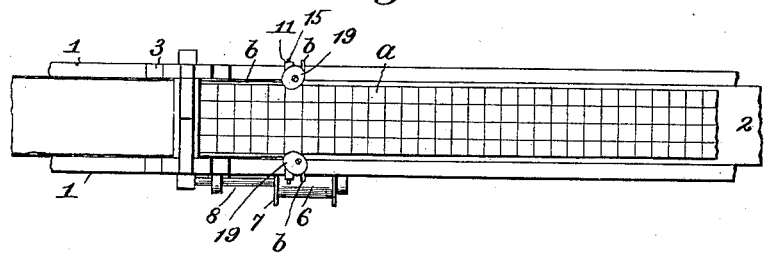
Figure 3:
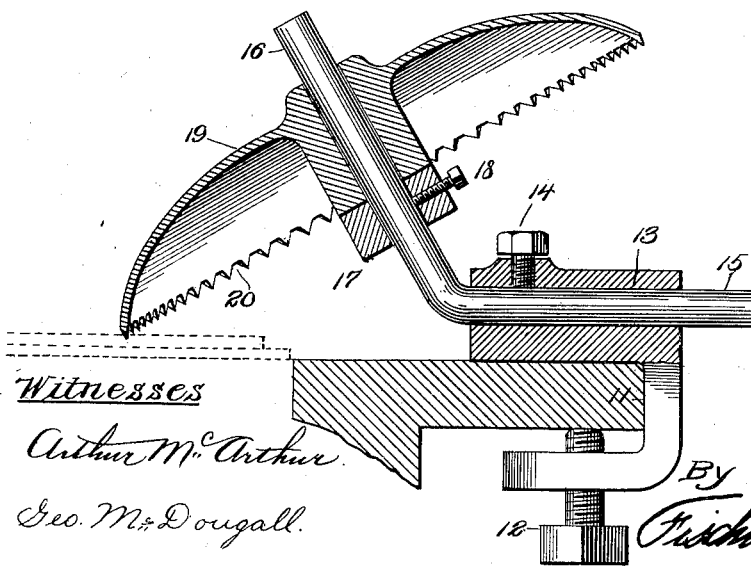

Figure 1 is a side elevation of a portion of a dough-cutting machine equipped with scrappers embodying my invention. Fig. 2 is a top plan view of the same. Fig. 3 is a cross-section of the scrapper, the relative positions of the belt and dough being shown by dotted lines.

In the said drawings, 1 designates the frame of a cracker or cake cutting machine of any preferred type, and 2 designates the endless conveyer or belt thereof, the same traveling intermittently in the direction indicated by the arrows, Fig. 1.

3 designates the frame for the vertically-reciprocating die or cutter 4, said die or cutter being operated by the reciprocating rods 5 to cut the dough $a$, which travels with an intermittent motion, into crackers or cakes, it being understood, of course, that this cutting action does not completely sever the individual crackers or cakes from each other nor from the ragged side or waste strips $b$. These waste strips are caused by the scrapper, hereinafter described, to pass off over the side of the machine down onto a transverse belt 6, underlying the frame for the purpose of dropping both waste strips into a pan or receptacle (not shown) at the side of the machine, from which it can be most conveniently removed, and to make this operation more reliable the conveyer is provided with marginal walls 7, which prevent the strips from slipping off the belt. This belt is suitably journaled, and its driving-shaft 8 is provided with a ratchet-wheel 9, which operates intermittently, the actuating means being a gravity-pawl 10 on one of the rods 5.

Referring now to the scrapper proper, 11 designates a yoke-casting provided with a clamping-screw 12 for engagement with the frame of the machine. It is also provided with a circular passage 13 and with a set-screw 14, communicating with said passage near its inner end and adapted by engagement with the shaft 15 to secure the latter rigidly at the desired point in its longitudinal or rotatable adjustment, it being capable of both adjustments for the purpose which is hereinafter explained. This shaft is provided at its inner end with an arm 16, which slopes upwardly and inwardly over the belt, and with a collar 17, adjustable on said arm by means of a set-screw 18, so as to support the scrapping wheel or disk 19 in the desired position, said scrapper wheel or disk being journaled and free to turn upon shaft-arm 16 and of such proportion that its peripheral teeth 20, which are downwardly disposed, shall successively engage the dough, only a few teeth, however, being in engagement with the dough at any one time. This wheel or disk is preferably of the construction shown most clearly in Fig. 3; but it obviously is susceptible of modification in some particulars without departing from the invention. In practice, as shown in Fig. 2, the shaft 15 is adjustable longitudinally and rotatably, so as to dispose the wheel or disk in approximately the position shown in Fig. 2, there being a scrapper for each waste strip. As thus arranged it will be observed that the lowest teeth of the wheels or disks engage the dough in the outermost cuts made by the knife and that such engagement obviously causes them to rotate at the same speed as the belt and in a direction diverging slightly forward from the latter, this divergence of movement being for the purpose of gradually separating or tearing away from the central sheet portion such waste strips and forcing them to run over the sides of the machine, one of them, if desired, directly into a pan or receptacle (not shown) and the other onto the belt 6, which will deliver into the same receptacle. The importance of having the wheels or disks driven by the moving dough is to insure an absolute unison of movement, though this could probably be otherwise obtained, in order that should a tooth of the wheel or disk catch in a loose thread of the belt or its seam such thread will not be broken and will be automatically disengaged from the tooth. In this connection it will be apparent that the tapering of each tooth to a point, as shown in Fig. 3, will more reliably insure the separation from a thread without injury to the latter than would be the case if the tooth were otherwise formed; but it is to be understood that I do not confine myself to any particular shape of disk-tooth. I have found that the best results in the action of this disk are obtained by disposing the shaft-arms 16 not only upwardly and inwardly over the belt, but also by having them converge forward slightly, this result being obtained by the rotatable adjustment of the shaft, the greater such adjustment the greater or sharper the divergence of movement between the belt and the wheels or disks. The teeth by operating in the outermost cuts of the knife, as demonstrated in actual use, make absolute and positive the clean-cut separation of the strips from the body portion, and thereby effect an economy of operation, for the reason that there are no ragged-edged crackers or cakes which should be broken off by the person handling the peel before depositing the sheet of crackers into the oven in the usual way.

From the above description it will be apparent that I have produced a scrapper which cannot injure the carrying-belt, effects a clean-cut separation between the sheets of crackers or cakes and the marginal or waste strips of dough, and thereby an economy of operation, which can be manufactured and applied to any cutting-machine on the market at less cost than the scrappers now in use, and while I have illustrated and described the preferred construction of my invention it is to be understood that I reserve the right to make all changes which properly fall within the spirit and scope of the same.

Having thus described the invention, what I claim as new, and desire to secure by Letters Patent, is—

1. The combination of a cutting-machine having a traveling belt on which the dough is carried, and a scrapper, comprising a toothed wheel or disk engaging the dough, and rotating in substantially the same direction that the dough is moving.

2. The combination of a cutting-machine, having a traveling belt on which the dough is carried, and a scrapper, comprising a toothed wheel or disk engaging and turned by the moving dough.

3. The combination of a cutting-machine, having a traveling belt on which the dough is carried, and a scrapper comprising a shaft extending upwardly and inwardly over the dough, and a toothed wheel or disk journaled on said shaft and engaging the dough.

4. The combination of a cutting-machine, having a traveling belt on which the dough is carried, and a scrapper, comprising a rotatably-adjustable shaft extending upwardly and inwardly over the dough, and a toothed wheel or disk journaled on said shaft and engaging the dough.

5. The combination of a cutting-machine, having a traveling belt on which the dough is carried, and a scrapper, comprising a longitudinally-adjustable shaft extending transversely of and upwardly and inwardly over the dough, and a toothed wheel or disk journaled on said shaft and engaging the dough.

6. The combination of a cutting-machine, having a traveling belt on which the dough is carried, and a scrapper, comprising, a shaft extending transversely of the belt and upwardly and inwardly over the same, and adjustable both longitudinally and rotatably, and a toothed wheel or disk journaled on said shaft and engaging the dough.

7. The combination of a cutting-machine, having a traveling belt on which the dough is carried, and a scrapper comprising a yoke-casting detachably clamped to the cutting-machine frame, a shaft rotatably and longitudinally adjustable in said casting, and provided with an arm extending upwardly and inwardly over the dough, and a toothed wheel or disk journaled on said shaft and engaging the dough.

8. The combination of a cutting-machine, having a traveling belt on which the dough is carried, and a scrapper comprising a shaft extending upwardly and inwardly over the dough, a toothed wheel or disk journaled on said shaft and engaging the dough, and a collar adjustable on the shaft and supporting the toothed wheel or disk at the desired elevation.

In testimony whereof I affix my signature in the presence of two witnesses.

JOSEPH L. CAUSEY.

Witnesses:
    H. C. RODGERS,
    G. Y. THORPE.